(12) United States Patent
Veldman et al.

(10) Patent No.: US 9,938,453 B2
(45) Date of Patent: *Apr. 10, 2018

(54) PARTICULATE AGGREGATING AND SURFACE MODIFICATION WITH IMPROVED HYDROCARBON FLUID FLOW THROUGH THE AGGREGATED PARTICULATES AND OVER SOLID SURFACE REAGENTS AND METHODS FOR MAKING AND USING SAME

(71) Applicant: Sumisaujana TCM Chemicals Sdn. Bhd., Puncak Alam, Selangor (MY)

(72) Inventors: Raynard Veldman, Bellaire, TX (US); Arthur Thomas Gilmer, The Woodlands, TX (US); Mohammad Zaki Hasra Shafie, Selama (MY); Norazlam Norbi, Selangor (MY)

(73) Assignee: Sumisaujana TCM Chemicals Sdn. Bhd., Puncak Alam (MY)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,415

(22) Filed: May 24, 2016

(65) Prior Publication Data

US 2016/0264858 A1 Sep. 15, 2016

Related U.S. Application Data

(63) Continuation of application No. 14/558,446, filed on Dec. 2, 2014, now Pat. No. 9,550,938.

(30) Foreign Application Priority Data

Dec. 3, 2013 (MY) .......................... PI 2013004366

(51) Int. Cl.
| | |
|---|---|
| *C09K 8/80* | (2006.01) |
| *C08K 5/053* | (2006.01) |
| *C08K 3/34* | (2006.01) |
| *C08K 5/3432* | (2006.01) |
| *C08K 5/42* | (2006.01) |
| *C08K 5/092* | (2006.01) |
| *C08K 5/06* | (2006.01) |
| *C08K 5/00* | (2006.01) |
| *C09K 8/035* | (2006.01) |
| *C09K 8/56* | (2006.01) |
| *C09K 8/86* | (2006.01) |
| *C09K 8/575* | (2006.01) |

(52) U.S. Cl.
CPC ............... *C09K 8/80* (2013.01); *C08K 3/34* (2013.01); *C08K 5/00* (2013.01); *C08K 5/053* (2013.01); *C08K 5/06* (2013.01); *C08K 5/092* (2013.01); *C08K 5/3432* (2013.01); *C08K 5/42* (2013.01); *C09K 8/035* (2013.01); *C09K 8/56* (2013.01); *C09K 8/805* (2013.01); *C09K 8/86* (2013.01); *C09K 8/575* (2013.01); *C09K 8/5753* (2013.01)

(58) Field of Classification Search
None
See application file for complete search history.

(56) References Cited

U.S. PATENT DOCUMENTS

| | | | |
|---|---|---|---|
| 4,532,052 A * | 7/1985 | Weaver | ................. C09K 8/508 166/275 |
| 5,775,425 A | 7/1998 | Weaver et al. | |
| 5,787,986 A | 8/1998 | Weaver et al. | |
| 5,833,000 A | 11/1998 | Weaver et al. | |
| 5,871,049 A | 2/1999 | Weaver et al. | |
| 7,392,847 B2 | 7/2008 | Gatlin et al. | |
| 2010/0154140 A1 | 6/2010 | Simonet et al. | |

OTHER PUBLICATIONS

Veldman et al., U.S. Office Action dated Jan. 6, 2017, directed to U.S. Appl. No. 15/163,400; 10 pages.
Veldman et al., U.S. Office Action dated Jan. 11, 2017, directed to U.S. Appl. No. 15/163,412; 10 pages.
Veldman et al., U.S. Office Action dated Jan. 14, 2016, directed towards U.S. Appl. No. 14/558,446; 9 pages.
Veldman et al., U.S. Office Action dated Jun. 10, 2016, directed towards U.S. Appl. No. 14/558,446; 11 pages.
Veldman et al., U.S. Office Action dated Jul. 6, 2017, directed to U.S. Appl. No. 15/163,400; 8 pages.
Veldman et al., U.S. Office Action dated Jul. 6, 2017, directed to U.S. Appl. No. 15/163,412; 7 pages.

* cited by examiner

*Primary Examiner* — Jeffrey Washville
(74) *Attorney, Agent, or Firm* — Morrison & Foerster LLP

(57) ABSTRACT

Composition and methods using the compositions are disclosed, where the compositions include heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonate and/or reacted with alpha hydroxyl carboxcylic acids which form coatings that alter self-aggregating properties and/or aggregation propensities of the particles and surfaces. Furthermore, the coating can be used to improve filtration of fluids through particulate matter and it is found that the coating will increase hydrocarbon liquid and gas flow through or over treated particulates and surfaces.

6 Claims, No Drawings

PARTICULATE AGGREGATING AND SURFACE MODIFICATION WITH IMPROVED HYDROCARBON FLUID FLOW THROUGH THE AGGREGATED PARTICULATES AND OVER SOLID SURFACE REAGENTS AND METHODS FOR MAKING AND USING SAME

CROSS-REFERENCE TO RELATED APPLICATIONS

This application is a continuation application of U.S. patent application Ser. No. 14/558,446 filed on Dec. 2, 2014 which is a non-provisional application claiming priority to Malaysian Patent Application No. PI 2013004366, filed on Dec. 3, 2013, the contents of which prior application is incorporated herein by reference.

BACKGROUND OF THE INVENTION

1. Field of the Invention

Embodiments of the present invention relate to: (1) aggregating agents for treating solid materials, surfaces, and/or substrates including metal oxide or ceramic solid materials, surfaces, and/or substrates (natural or synthetic), metallic solid materials, surfaces, and/or substrates, or other types of solid materials, surfaces, or substrates while improving the hydrocarbon liquid and gas flow, (2) treated materials and (3) methods for making and using same.

More particularly, embodiments of the present invention relates to aggregating agents for particulate solid materials, surfaces, and/or substrates, where the aggregating agents modify surface properties of the materials, surfaces, and/or substrates increasing their aggregating propensity or properties. The present invention also relates to coated or modified materials, surfaces, or substrates, where the coating modifies surface properties of the materials, surfaces, and/or substrates to improve the liquid hydrocarbon or gas fluid flow around and through the solid materials, surfaces, and/or substrates. The present invention also relates to methods for altering an aggregation propensity of materials, surfaces, or substrates especially in downhole applications and in any other application, where altering an aggregation propensity of particulate solid materials, surfaces, or substrates is desirable or beneficial. The present invention also relates to methods for altering surface properties of materials, surfaces, or substrates especially in downhole applications and in any other application, where altering surface propensity of particulate solid materials, surfaces, or substrates to improve hydrocarbon liquid or gas flow through or around the solid materials is desirable or beneficial.

2. Description of the Related Art

Historically, the problem of aggregating particulate materials downhole has been addressed using epoxy resins, phenolic resins and tackifying agents as described in U.S. Pat. Nos. 5,833,000; 5,871,049; 5,775,425; and 5,787,986.

More recently, reactions products alkyl pyridines and phosphate esters were introduced as inner salt of alkyl pryridinium phosphate ester products, which resulted in a decrease in a zeta potential of the substrate and therefore helped agglomeration properties of the as set forth in U.S. Pat. No. 7,392,847.

Although these products are useful for aggregating or agglomerating particulates and treating formation surfaces and/or particles, there is still an need in the art for products that can augment aggregating or agglomerating properties of particles and/or surfaces and/or augment fluid flow of fluids through or around particles and/or surfaces.

SUMMARY OF THE INVENTION

Compositions

Embodiments of the present invention provide aggregating compositions for treating solid particles, surfaces and/or materials, where the compositions comprise amines including heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonates and also reacted with an alpha hydroxyl carboxylic acid.

Embodiments of the present invention provide particles, surfaces, and/or materials including a partial or complete coating of an aggregating composition of this invention, where the partial or complete coating alters self-aggregating properties and/or aggregation propensities of the particles, surfaces, and/or materials.

Embodiments of the present invention provide coatings of an aggregating composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonates where the coatings deform under pressure and impart an enhanced aggregating propensity to the particles, surfaces and/or materials.

Embodiments of the present invention provide a structure or substrate having surfaces partially or completed coated with an aggregating composition comprise heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with reacted with sulfonic acids, alkyl sulfonic acids, sulfosuccinates, sulfamic acids, sulfuric acids or partially neutralized amine or other alkali sulfonates and also reacted with an alpha hydroxyl carboxylic acid where the substrate is ideally suited for filtering fines and/or other particulate materials form a fluid, especially fluids used in oil/gas well drilling, completion, production, fracturing, propping, other production enhancing processes or other related applications. The substrates or structures can be ceramic or ceramic fibers or wools coated partially or completely with the compositions of this invention. Such substrates or structures are well suited for filter media to be used with or without screens.

Embodiments of the present invention provide methods for changing or altering an aggregation potential or propensity of a solid particles, surfaces, and/or materials, where the method includes the step of contacting the particles, surfaces, and/or materials with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonates and also reacted with an alpha hydroxyl carboxylic acid under conditions sufficient for the composition to form partial or complete coatings on particles, surfaces, and/or materials. The coated particles, surfaces and/or materials impart water flow and increase hydrocarbon liquid or gas flow.

Embodiments of the present invention provide methods for controlling sand or fines migration including the step of pumping a fluid including a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated monomers and diene monomers), or mixtures or combinations thereof reacted with sulfonic acids, alkyl sulfonic acids, sulfosuccinates, sulfamic acids, sulfuric acids or partially neutralized amine or other alkali sulfonates and also reacted with an alpha hydroxyl carboxylic acid through a matrix at a rate and pressure into a formation to control sand and fine production or migration into the production fluids.

Embodiments of the present invention provide other methods for controlling sand or fines migration including the step of depositing a coated particulate solid material of this invention adjacent screen-type sand and fines control devices so that the sand and/or fines are attracted to the coated particles and do not encounter or foul the screen of the screen-type device.

Embodiments of the present invention provide methods for improving hydrocarbon liquid and gas flow around, through, or over coated particulate solid material, substrates or surfaces.

DETAILED DESCRIPTION OF THE INVENTION

The inventors have found that aggregating compositions can be prepared that alter an aggregation propensity of solid particles, surfaces, and/or materials, when the particles, surfaces and/or materials are treated with an amount of the compositions sufficient to form partial or complete coating on the particles, surfaces, and/or materials. The inventors have also found that particles, surfaces, and/or materials may be treated with the compositions of this invention, where the particles, surfaces and/or materials are coated partially or completely with the composition to form modified or coated particles, surfaces, and/or materials. The resulting modified or coated particles, surfaces and/or materials have improved aggregation tendencies and/or propensities. The inventors have also found that the compositions, the modified metal-oxide-containing particles, surfaces and/or materials may be used in oil field applications including drilling, fracturing, producing, injecting, sand control, or any other downhole application. The inventors have also found that a coated particulate metal-oxide-containing solid compositions may be formed, where the coating is deformable and the coated particles tend to self-aggregate and tend to cling to surfaces having similar coatings or having similar chemical and/or physical properties to that of the coating. That is to say, the coated particles tend to prefer like compositions, which increases their self-aggregation propensity and increases their ability to adhere to surface that have similar chemical and/or physical properties. The compositions are also ideally suited for decreasing fines migrating into a fracture pack or to decrease the adverse impact of fines migration into a fractured pack. What is very surprising and unexpected about the present compositions is that the coating are enhanced when the sulfonates are introduced into the formulation in the absence of phosphate esters. In the prior applications cited above, the coating that were formed required a reaction produce between an amine and a phosphate ester. A further surprise is the addition of an alpha hydroxy carboxylic acid to the formulation resulting in improved water dispersibility of the product which makes it easier to inject into the formation and makes the product applicable to the enhanced oil recovery market (EOR).

The compositions comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonate and also reacted with an alpha hydroxyl carboxylic acid are able to modify the aggregating propensity of surface and particles treated without the phosphate ester results in improved water wetting and improved aggregating propensity where water flow is reduced and hydrocarbon liquid or gas flow is increased is not found in prior compositions.

One problem in oil and gas production from wells is the control of the co-production of fines and sand from producing formations. Besides the co-production of particulate materials during oil and/or gas production from wells, flowback of proppant and/or fines after formation fracturing is also a problem. Additionally, it has been found that Steam Assisted Gravity Drainage (SAGD) processing of oil and/or gas wells de-stabilizes sand/fines during and after steam injection during SAGD processing.

Certain embodiments of this invention relate to aggregating compositions comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonate and also reacted with an alpha hydroxyl carboxylic acid.

Compositions

Embodiments of the present invention broadly relate to compositions including aggregating systems including one or a plurality of aryl amines (heterocyclic aromatic amines), one or a plurality of substituted aryl amines (substituted heterocyclic aromatic amines), one or a plurality of polymers or copolymers including at least one monomer vinyl aryl amine (vinyl heterocyclic aromatic amine), and/or mixtures or combinations thereof reacted with sulfonic acids, alkyl sulfonic acids, sulfosuccinates, sulfamic acids, sulfuric acids or partially neutralized amine or other alkali sulfonate. Embodiments of the present invention broadly relate to compositions including aggregating systems including one or a plurality of aryl amines (heterocyclic aromatic amines), one or a plurality of substituted aryl amines (substituted heterocyclic aromatic amines), one or a plurality of polymers or copolymers including at least one monomer vinyl aryl amine (vinyl heterocyclic aromatic amine), and/or mixtures or combinations thereof reacted with alpha hydroxyl carboxylic acids. In certain embodiments, the compositions of this invention include high molecular weight one or a plurality of aryl amines (heterocyclic aromatic amines), one or a plurality of substituted aryl amines (substituted heterocyclic aromatic amines), one or a plurality of polymers or copolymers including at least one monomer vinyl aryl amine (vinyl heterocyclic aromatic amine), and/or mixtures or combinations thereof sulfonic acids, alkyl sulfonic acids, sulfosuccinates, sulfamic acids, sulfuric acids or partially neutralized amine or other alkali sulfonate and also reacted with an alpha hydroxyl carboxylic acid in a carrier. The compositions may also include glycols and glycol ethers or alcohols. The compositions modify surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate and/or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Embodiments of the present invention broadly relate to methods for treating metal oxide-containing surfaces including the step of contacting the metal oxide-containing surface with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonate.

Embodiments of the present invention broadly relate to compositions including aggregating systems including one or a plurality of aryl amines (heterocyclic aromatic amines), one or a plurality of substituted aryl amines (substituted heterocyclic aromatic amines), one or a plurality of polymers or copolymers including at least one monomer vinyl aryl amine (vinyl heterocyclic aromatic amine), and/or mixtures or combinations thereof reacted also with alpha hydroxyl carboxylic acids. The compositions may also include glycols, glycol ethers or alcohols. The compositions are thought to form a coating on the surface altering the properties of the surface so that the surface is now capable to interacting with similarly treated surfaces to form agglomerated and/or aggregated structures.

Embodiments of the present invention broadly relate to methods for treating metal oxide-containing surfaces including the step of contacting the metal oxide-containing surface with a composition comprising heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof reacted with sulfonic acids, alkyl sulfonic acids, sulfosuccinates, sulfamic acids, sulfuric acids or partially neutralized amine or other alkali sulfonate and also reacted with alpha hydroxyl carboxylic acids. The compositions may also include glycols, glycol ethers or alcohols. The compositions are thought to form a coating on the surface altering the properties of the surface so that the surface is less resistive to hydrocarbon liquid and gas flow and more resistive to water flow.

Suitable Materials for Use in the Invention

Suitable amines capable of forming a deformable coating on a solid particles, surfaces, and/or materials include, without limitation, heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated mononers and diene monomers), or mixtures or combinations thereof, where the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. In certain embodiments, amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the poly vinyl heterocyclic amines include, without limitation, polymers and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof. In certain embodiments, the heterocyclic aromatic amines comprise HAPT™-310 and PAP 220 available from Vertellus Specialties Inc.

Suitable sulfonic acids, alkyl sulfonic acids, sulfosuccinates, sulfamic acids, sulfuric acids or partially neutralized amine or other alkali sulfonate include without limitation sulfuric acid, sulfamic acid, sulfonic acid, alkyl sulfonic acids such as propane sulfonic acid or dodecylbenzene sulfonic acid, cyclic sulfonic amido sulfonic acids such as 2 acrylamido 2 methylpropane sulfonic acid aromatic sulfonic acids, sulfosuccinates such as dioctyl sulfosuccinate, or dihexyl sulfosuccinate or other partially neutralized salt of the afore mentioned acids.

Suitable alpha hydroxyl carboxylic acids for use in the present invention include without limitation citric acid, glycolic acid, and lactic acid or mixture or combination thereof.

Suitable carriers for use in the present invention include, without limitation, low molecular weight alcohols having between 1 and 5 carbon atoms, where one or more of the carbon atoms may be oxygen or mixtures or combinations thereof. Exemplary examples include methanol, ethanol, propanol, isopropyl alcohol, butanol, isobutanol, pentanol, isopentanol, neopentanol or mixture or combinations thereof.

Suitable glycols and glycol ethers include, without limitation, monoethanol glycol, triethylene glycol, tetraethyleneglycol, pentaethylene glycol, propylene glycol, ethylene glycol monomethyl butyl ether, dipropyl monomethyl butyl ether or mixture or combinations thereof.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Compositional Ranges and Properties

Embodiments of the aggregating compositions of this invention including:

from about 20 wt. % to about 70 wt. % of a heterocyclic aromatic amine, a substituted heterocyclic aromatic amine, poly vinyl heterocyclic aromatic amine, a copolymer of vinyl heterocyclic aromatic amine and non amine polymerizable monomers (ethylenically unsaturated mononers and diene monomers), or mixtures or combinations thereof;

from about 1 wt. % to about 10 wt. % of sulfonic acids, alkyl sulfonic acids, sulfosuccinates, sulfamic acids, sulfuric acids or partially neutralized amine or other alkali sulfonate, from about 1 wt % to about 10 wt. % of alpha hydroxyl carboxylic acid, and from about 1 wt. % to about 30 wt. % of a glycol, and from about 1wt. % to about 30 wt. % of a glycol ether.

Experiments of the Invention

The following formulation was made and then used to coat sand. After washing the sand with 5 wt. % of the chemical in 2 wt. % KCl, the treated sand was rewashed with only 2 wt. % KCl five times before measuring the time it took for 100 ml of either 2 wt. % KCl of crude oil to flow through a column of the sand. The times are compared to the same weight/volume of the untreated sand also washed five times with 2 wt. % KCl.

Chemical:
56 wt. % of alkyl pyridine blend
3 wt. % of acrylamido propane sulfonic acid
3 wt. % of citric acid
10 wt. % of dipropyl monomethyl butyl ether
28 wt. % of ethylene glycol
Results: Each test is time for flow of 100 ml of oil or brine

|  | Untreated | Treated with Sand Control Chem |
|---|---|---|
| 2 wt % KCL | 30 sec | 35 sec |
| Oil | 690 sec | 85 sec |

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for improving hydrocarbon liquids and gas flow in subterranean formations or through sand, packing material or particulates by contacting the particles, surfaces and/or materials in the formations, vessel or other means of containing the particles, surfaces and/or materials with a coating composition including 20-70 wt % of the coating composition of one or a plurality of aryl amines, one or a plurality of substituted aryl amines, one or a plurality of polymers or copolymers including at least one monomer vinyl aryl amine, and/or mixtures or combinations thereof reacted with 1-10 wt % of the coating composition of sulfonic acids, alkyl sulfonic acids, sulfosuccinates, sulfamic acids, sulfuric acids or partially neutralized amine or other alkali sulfonate and reacted with 1-10 wt % of the coating composition of an alpha hydroxyl carboxylic acid which form complete or partial coating on the particles, surfaces that result in increased flow through the treated particles, surfaces and/or materials.

2. The method of claim 1, wherein the coating composition further includes a carrier.

3. The method of claim 1, wherein the amines comprises heterocyclic aromatic amines, substituted heterocyclic aromatic amines, poly vinyl heterocyclic aromatic amines, co-polymers of vinyl heterocyclic aromatic amine and non amine polymerizable monomers, or mixtures or combinations thereof, where the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

4. The method of claim 1, wherein the amines comprises aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

5. The method of claim 1, wherein the sulfonic acids, alkyl sulfonic acids, sulfosuccinates, sulfamic acids, sulfuric acids or partially neutralized amine or other alkali sulfonate include without limitation sulfuric acid, sulfamic acid, sulfonic acid, alkyl sulfonic acids such as propane sulfonic acid or dodecylbenzene sulfonic acid, cyclic sulfonic amido sulfonic acids, sulfosuccinates or other partially neutralized salt of the afore mentioned acids.

6. The method of claim 1, wherein the alpha hydroxyl carboxylic acid include without limitation citric acid, glycolic acid, and lactic acid or mixture or combination thereof.

* * * * *